Nov. 7, 1939.   C. R. MABON   2,179,155
STRIP FEEDING AND CONTROLLING MECHANISM FOR TYPEWRITING MACHINES
Filed Sept. 8, 1936   3 Sheets-Sheet 1
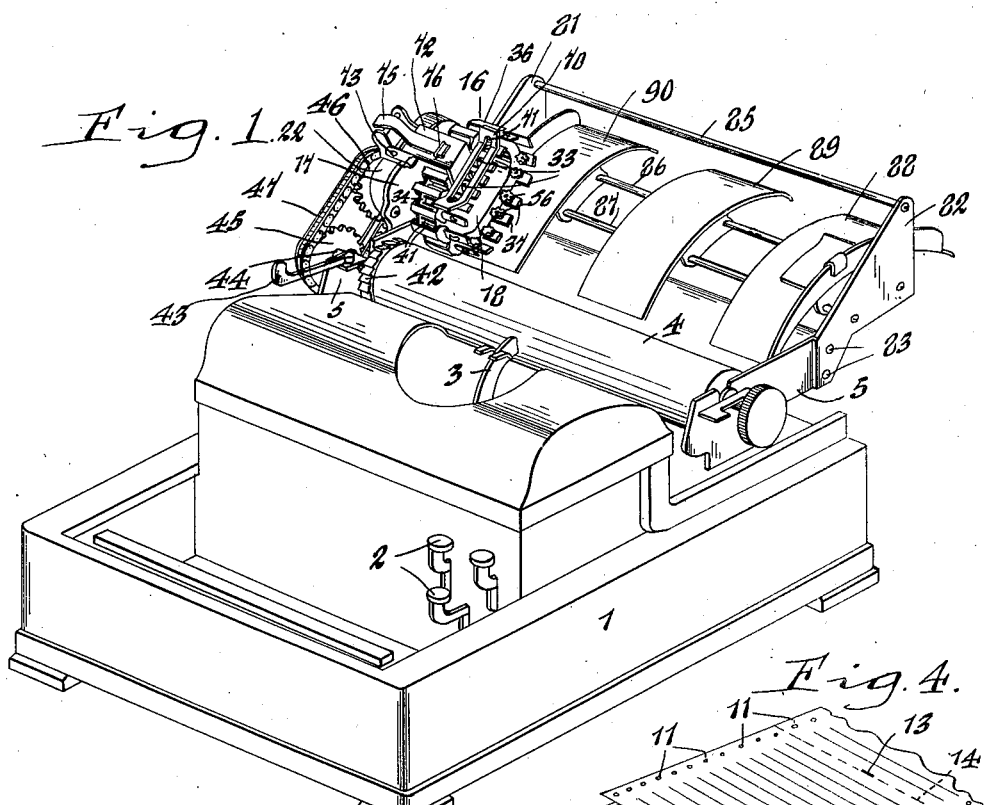
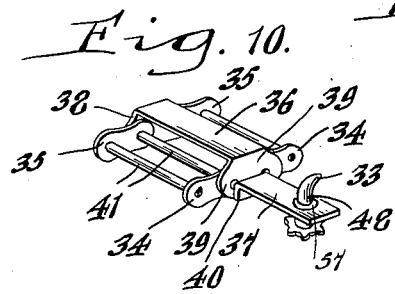
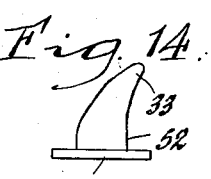
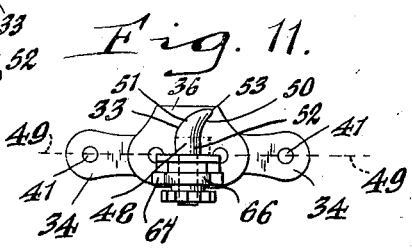
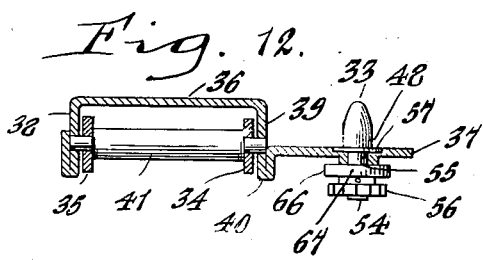
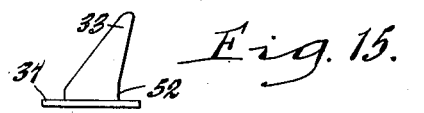
Inventor
Carl R. Mabon
by [signature]
Attorney.

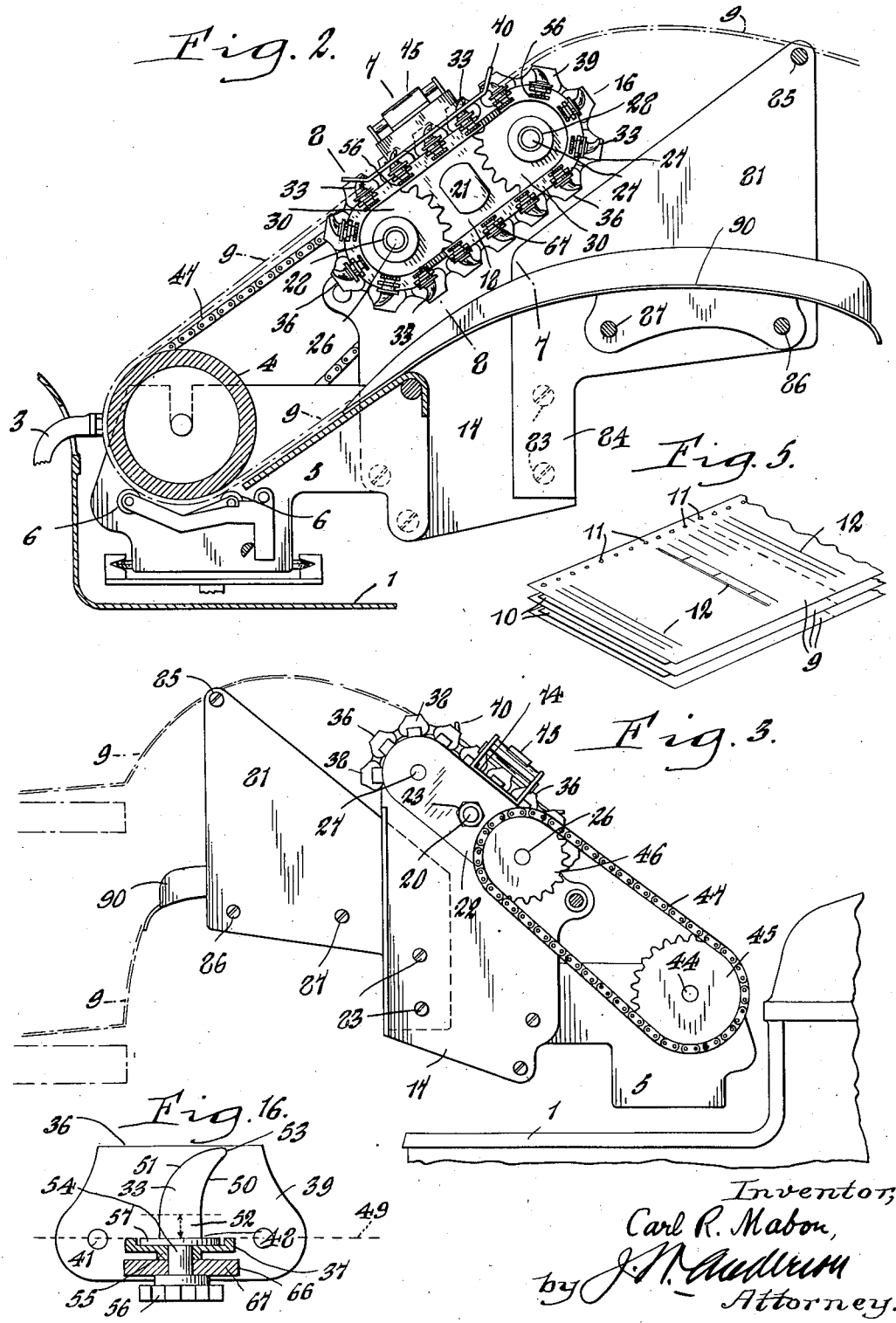

Nov. 7, 1939.  C. R. MABON  2,179,155
STRIP FEEDING AND CONTROLLING MECHANISM FOR TYPEWRITING MACHINES
Filed Sept. 8, 1936  3 Sheets-Sheet 3
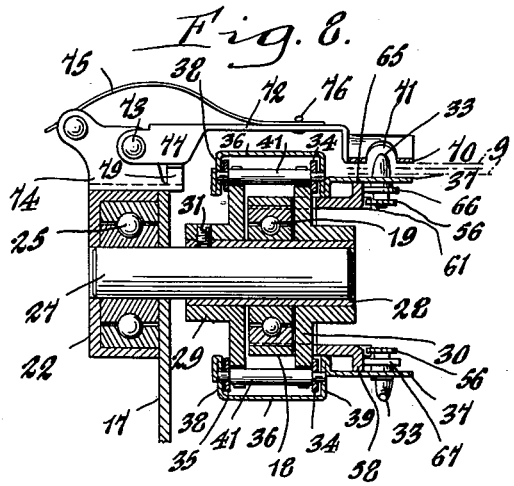
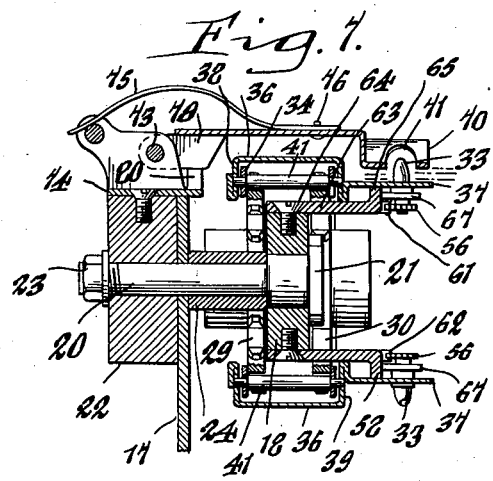
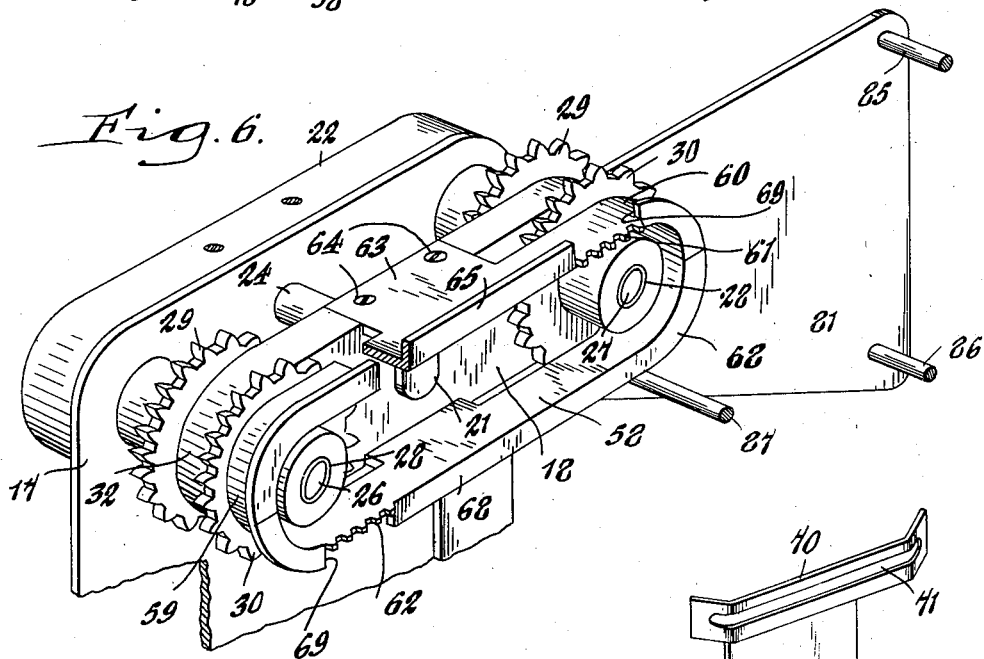
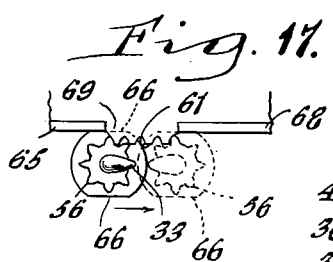
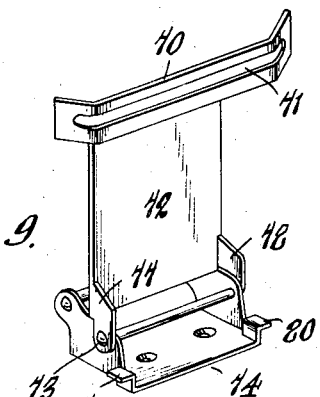
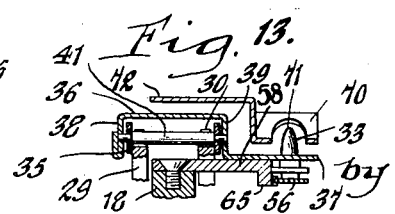
Inventor
Carl R. Mabon
by J. M. Anderson
Attorney.

Patented Nov. 7, 1939

2,179,155

UNITED STATES PATENT OFFICE 2,179,155

STRIP FEEDING AND CONTROLLING MECHANISM FOR TYPEWRITING MACHINES

Carl R. Mabon, Niagara Falls, N. Y., assignor to Gilman Fanfold Corporation, Niagara Falls, N. Y., a corporation of Delaware Application September 8, 1936, Serial No. 99,789

23 Claims. (Cl. 197—133)

This invention relates to machines of various different types utilizable in recording data on record strips, such as ordinary typewriting machines of the various different designs; billing machines, tabulating machines; teletype machines; electric typewriters, so-called; autographic registers, and other recording machines, and has special relation to feeding and controlling the paper record strip, or strips, in its passage through such machines.

The general object of the invention is to provide an improved strip-feeding mechanism for machines of the class mentioned which will feed the strips accurately and keep them in accurate alignment with each other and correctly positioned with reference to the writing line at all times, while at the same time avoiding mutilation or other injury to the strips being fed.

Another object of the invention is to provide, in machines of the character referred to, a simple and efficient pin feed mechanism whereby the strip or strips to be fed may be effectively aligned or registered with each other and the entry or disengagement of the pins from the strips accomplished with a minimum of injury of the feed apertures in the strips.

Another object is the provision in machines of the character referred to, of a practical pin feeding mechanism whereby the position or angles of the pins relative to their path of feed are such as to be adapted for effecting easy entry and exit of the pins.

Another object is the provision in machines of the character referred to, of a practical and efficient band of strip feeding pins, the pins having relation to the band adapting them for being shifted to different positions facilitating entry and exit from strip engagement.

Another object is the provision in machines of the character referred to, of a simple and efficient band of strip feeding pins in which the relation between the band and the strip feeding and engaging sections of specially mounted pins conduces to efficient strip feeding and to entry into and exit of the pins from engagement with the strips.

Another object is the provision in machines of the character referred to, of a simple and practical arrangement of a pin guiding chain and pins shiftable on the chain, conducive to efficient strip feeding and aligning and minimizing injury to the strips.

Another object is the provision in machines of the character referred to, of a simple construction of rotary pin and devices for controlling its rotation.

Another object is the provision in machines of the character referred to, of a simple and efficient construction for supporting and guiding a series of curved strip feeding pins which are rotatably mounted.

Another object is the provision in machines of the character referred to of a practical and efficient construction of a strip feeding mechanism utilizing pins having side portions inclined to their plane of feed movement and shiftable to different positions relative to the direction of feed.

Another object is the provision in machines of the character referred to, of a practical and simple construction for supporting strip feeding pins for rotary shift movement relative to a pin-guiding member.

Another object is the provision in machines of the character referred to, of a practical and efficient strip feeding and controlling pin rotatable to different positions and having fore and aft portions of different shape, the pins being rotatable for reversing the positions of the portions of different shape.

Other objects of the invention will be in part pointed out in the sub-joined detailed description of certain illustrative but preferred embodiments of the invention and will be in part obvious in connection therewith.

In the accompanying drawings forming part of the specification and wherein similar reference characters refer to similar parts throughout the several views:

Fig. 1 is a perspective view of a recording machine in which this invention is embodied, the recording machine being a typewriting machine;

Fig. 2 is an enlarged vertical section through Fig. 1, showing the pin feed mechanism, the platen and other instrumentalities;

Fig. 3 is a fragmentary elevational view looking at the opposite side of the machine from Fig. 2, and showing certain details;

Fig. 4 is a fragmentary illustration of certain stationery which may be employed in the utilization of the present invention;

Fig. 5 illustrates a modified form of stationery which may be employed;

Fig. 6 is a perspective view illustrating mechanism which may be employed for actuating and controlling the strip feeding pins, this figure also showing certain details of construction for mounting the parts on the typewriting machine;

Fig. 7 is a cross section through the feed mechanism, on the line 7—7, Fig. 2;

Fig. 8 is a cross section through the feed mechanism, on the line 8—8, Fig. 2;

Fig. 9 is a perspective view of a strip guide and retainer which may be employed;

Fig. 10 is a perspective view showing some of the chain links and a feed pin on one of the links;

Fig. 11 is a side view, somewhat enlarged over Fig. 10, and showing a feed pin associated with links of the chain;

Fig. 12 is a cross section taken through one of the pin carrying links of the chain;

Fig. 13 illustrates a slightly modified form of chain link and its associated pin;

Figs. 14 and 15 illustrate modified forms of feed pins on an exaggerated scale.

Fig. 16 is an enlarged sectional elevation showing the structure of one of the feed pins and its mounting;

Fig. 17 is a fragmentary, partially diagrammatic plan view showing the operation of one of the feed pins.

Referring now more specifically to the drawings, numeral 1 indicates the base frame of a typewriting machine, which may be an ordinary typewriting machine provided with the customary character keys 2 for actuating the respective type bars 3 for effecting printing on the cylindrical platen 4. The platen 4 may be mounted in the customary manner on the shiftable platen carriage 5, which latter is shiftable in line spacing and in letter spacing direction, and it may be shifted up and down for selecting the case letters or characters, all as usual in typewriting machines. Beneath the platen 4 are the customary feed rolls 6 which may be manually shifted to and from the platen for gripping the paper to the platen thereby to effect feed of the record strips by rotation of the platen, this rotation being effected by the customary line spacing mechanism of machines of the character referred to. It is to be understood that although the present invention is illustrated herein as embodied in an ordinary typewriting machine with shiftable platen carriage, it is not limited in its application to such machine, but may be employed in various other types of recording machines, as for instance in tabulating machines, billing machines, and in fact in all recording machines wherein the feeding, controlling and aligning of record strips relative to each other or to the machine is sought. And it is furthermore to be understood that whereas a rotatable cylindrical platen is illustrated herein, the invention is applicable to machines in which the platen is non-rotatable, and also wherein a flat platen is employed. In recording machines in which feed rolls, as the rolls 6, are employed, it is preferred to set these rolls in their lower position, free of grip on the record strips, and so that the pin feeding mechanism hereinafter described may draw and feed the record strips loosely between the platen and feed rolls.

It is preferable to utilize the present invention for the feeding of a record strip having a row or series of preformed feed apertures, and whereas the invention contemplates the use of pin feed mechanism for coaction with a row of feed apertures at each lateral margin of the record strips, it is preferred to arrange the pin feed mechanism for coaction with apertures at but one margin of the stationery or record strip as shown in Fig. 1. By so doing, practically the full width of the machine is available for consideration and manipulation of the record strips, and also record strips of different width may be employed without altering the position of the pin feeding mechanism.

One of the important uses of the present invention is for feeding a plurality of relatively superposed continuous record strips for making manifold copies. The original and the relatively superposed copy strips are customarily printed each with a series of similar forms, and it is desired that the imprint upon underlying forms shall be in the same relative position as the imprint on the original superposed form. In such stationary, the preformed feed apertures in each of the underlying strips are in the same relation to the forms as are the feed apertures in the original strip, so that when the apertures of superposed strips are in superposed registry, there is assurance that the printed forms are also in registry. Thus an important object of the present invention is to assure or secure alignment or registry of relatively superposed apertures, either with respect to each other or with respect to a portion of the machine, as for instance, to the printing line where the type coacts with the platen to make the imprint.

Referring to Fig. 5, three relatively superposed record strips 9 are illustrated, such strip assemblage having two interleaved transfer or carbon strips 10, the transfer strips being narrower than the record strips 9. In each of the record strips 9 is a row or series of feed apertures 11, the record strips having each a series of similar printed forms 12, underlying one another in registered or aligned relation, when the feed apertures 11 of the forms are in superposed registry. There is but one row of feed apertures 11 in the record strips of Fig. 5, the carbon strips 10 being disposed laterally out of registry with the feed apertures 11, and the respective strips of Fig. 5 being unattached to each other.

In Fig. 4, the printed forms and feed apertures have the same relation to each other as explained in connection with Fig. 5, but in this instance the several superposed strips are attached together by the staples 13, or in any other suitable manner, these attaching devices being distributed at intervals throughout the length of the assemblage of strips, and preferably being on the transverse weakening lines or lines of perforation 14. Although in Fig. 4 the feed apertures occur at both margins of the strip, as indicated at 11 and 15, it is to be understood that the apertures may be omitted from one margin when desired. And the carbon strips in Figs. 4 and 5 may be of full width and provided with feed apertures, if desired.

The pin feeding mechanism is shown, generally, at 16 in Fig. 1. The numeral 17 (Figs. 3 and 6) indicates a supporting standard, being a strong and rigid, flat, relatively thick plate firmly affixed to the side of the shiftable platen carriage 5 of the typewriting machine. The standard 17 may extend upwardly to a plane above the platen 4, as illustrated. The numeral 18 (Fig. 6) illustrates a rigid frame block, preferably of metal, this block 18 being cored out at each of its opposite ends for the reception of ball bearings 19 for rotatably mounting the sprocket wheels hereinafter described. At its center, the block 18 has an aperture through which passes the bolt 20 having a clamping, non-circular head 21, the opposite end of the bolt extending through the standard plate 17 and also through a strong and rigid clamping block 22 located at the outside of the standard 17, this bolt being provided with a nut 23 cooperating with the bolt 20 firmly to clamp the frame block 18 in relation to the standard 17. In order to dispose the frame block 18 at a desired position laterally of the machine, a strong spacer sleeve 24 may be disposed between the standard 17 and the frame block 18, this spacer sleeve participating in the clamping effect. The opposite ends of the clamping block 22 may also be cored out and ball bearings, as 25, located therein.

The numerals 26 and 27 indicate two parallel stub shafts which pass through the standard plate 17 and are supported for rotation in the ball bearings 19 and 25 in the respective frame block 18 and clamping block 22. Inasmuch as the sprocket wheel construction and the bearing support therefor in these two blocks is the same at each end of these blocks and is shown in Fig. 8, a description of one will suffice for both. Referring to Fig. 8, the stub shaft 27 has affixed thereto a sleeve 28 which passes through the frame block 18, and a sprocket wheel is affixed to this sleeve. Each sprocket wheel is composed of two sprocket wheel sections 29 and 30, the hubs of which may be sweated or tightly fitted on the sleeve 28, and the sections affixed to the stub shaft 27 by means of the screw 31 which passes through the hubs of the sprocket wheel sections and also through the sleeve 28 and secures the sprocket wheel sections and the sleeve to the stub shaft 27, so that all these parts rotate as one. The outer periphery of the frame block 18 is curved at each end as indicated at 32, and the teeth of the sprocket wheel sections 29 and 30 rotate in a plane above or outside these curved parts of the block 18.

One of the important aspects of this invention pertains to the feed and control of record strips by pins which enter the strips and have movement in direction to feed the strips. The pins are indicated by the numerals 33. For guiding the pins, a pin guiding member is employed, which is preferably an endless band, and this endless band preferably takes the form of a chain of pivotally connected links, although other forms of band are within the purview of this invention. In the embodiment illustrated (see Figs. 10, 11 and 12) the chain is composed of links having side members 34, 35 of similar construction, alternating with links 36 on which latter the pins are mounted, as shown clearly in Fig. 10. The pin carrying links 36 each has a pin supporting plate 37 laterally projecting therefrom, and may be bent from integral metal to provide the two side members 38 and 39, the plate 37 being provided by bending the side member 39 upwardly from its lower edge 40 and thence laterally outwardly in the plane of the axis of the pivotal connection 41 between the links. The several pivotal connections 41 between the links provide teeth of the sprocket chain for cooperation with the teeth of the sprocket wheels hereinbefore described to effect movement of the chain and thereby impart strip feeding movement to the feed pins 33. From the arrangement of chain and sprocket wheels as illustrated (see Fig. 2), it will be seen that the pin guiding member or chain of links moves in a path having circular parts around the sprocket wheels, and a part between the sprocket wheels which is tangential to the circular parts, and is generally parallel to the path of the strip, and it will furthermore be seen that the plates 37 and the bases of the feed pins 33 travel in a path which is in the plane of the line of centers of the pivotal axes of the links.

With the arrangement above described it will be perceived that as the pins move in their circular path toward the path of the strip, the pins will enter the apertures in the strip and eventually make strip feeding engagement with the edges of the apertures, the feed movement of the pins resulting in the feeding of the strip or strips over the platen 4, in response to line spacing actuation or other feed actuation of the pin feeding mechanism.

For effecting feeding or line-spacing movement of the feed pins, rotary movement is imparted to one or the other of the duplicate sprocket wheels 29 and 39, from the mechanism which, in the ordinary typewriting machine, imparts line-spacing movement to the platen 4, this mechanism being well known and usually including a ratchet wheel rotated to effect line-spacing movement of the platen 4. It has not been thought necessary to disclose herein all the details of such mechanism, it being sufficient to note that said ratchet wheel is shown at 42, Fig. 1, being connected to rotate the platen, the usual operative connections from the line space lever 43 being provided to rotate the ratchet wheel 42 to effect line-spacing. Rotatable with the ratchet wheel 42 is a short shaft 44, having a driving sprocket wheel 45 affixed to shaft 44 in any practical manner. Mounted on the stub shaft 26 is a diven sprocket wheel 46, of selected diameter, and which is driven by the connecting sprocket chain 47. Thus actuation of the line-spacing mechanism of the machine causes feed-movement and line-spacing movement of the strip-feeding pins 33, by the chain of links 34 and 36, and drives the pins into and out of the path of the strip as they progress with the pin-guiding band or chain heretofore described.

Although the feed apertures 11 in the strips may be of materially larger diameter than the strip feeding sections of the pins 33, the present invention is readily usable with feed apertures differing only slightly, if at all, from the size of the feed sections of the pins. Normal tolerance suffices and is preferred. A difference in diameter of one-sixty-second of an inch is sufficient in many instances. The feed apertures 11 are distributed in a series throughout the lengths of the several strips and at equal distances apart, and the feed-pins 33 are also longitudinally spaced apart at distances equal to the spacing of the apertures 11, and, in the preferred arrangement, a length of links, diameter of pitch-circle and position of base of feed pin are chosen whereby the bases of the pins 33 will travel in a plane in or substantially in the plane of the pitch line, or line of centers of the pivots, of the chain, the pins having strip-engaging-and-feeding sections outside said plane.

By reference to Figs. 2, 10, 11 and 12, it will be observed that the base or root 48 of the feed pins 33 is substantially in the plane or at the level of the line of centers of the axes of the pivots 41 of the links, and that the bottom record strip, or the single record strip, if but one strip be employed, may rest on the pin-supporting plate 37 where the aperture in strip or strip assemblage is engaged by the feed pin. Thus provision is made for supporting the strip in or substantially in the plane of said line of centers, or line of connection of the chain, and also for pin feeding engagement of the strip in or very close to the plane of said line of centers. Also it is preferred to utilize a length of link and diameter of sprocket wheels 29, 30, such that the imaginary straight line 49 (Fig. 11) joining the pivotal axes in each link lies in such a chord to the pitch-circle of the sprocket wheel that the plate 37 travels around the sprocket wheels relatively close to the plane of the pitch circles thereof. In this wise the bases of the pins 33 also travel in their circular path in a plane close to that of the pitch circle.

In some cases the feed pins, as illustrated in Fig. 13, may have their bases well inside said line of centers of the links, in which event relatively long straight feed pins may be employed, as exemplified in applicant's prior applications, Serial No. 54,102, filed December 12, 1935, and Serial No. 96,516, filed August 17, 1936, to which reference is made. The subject matter of the inventions claimed in said prior applications is not claimed in the present application. When the feed-sections of the pins lie at substantially the level or plane of the line of centers of the links, straight pins may also be used, and are within the purview of the related aspect of this invention. The adaptability of straight pins under such circumstances is available more for a single strip or a thin assemblage of relatively superposed strips.

For feeding and controlling a relatively large number of superposed record strips by pins having strip-engaging-and-feeding sections above or outside said line of centers, the strip feeding pins 33 each has a front side or face portion 50 inclined from the perpendicular to the plane of feed movement of its support or plate 37. Also the opposite or back side portion 51 is inclined from the perpendicular to the plane of feed movement of the plate 37. In practice it is preferred that these inclined sides be curved longitudinally of the pins so as to present a concave front portion and a convex rear portion on each of the pins 33, as will be clear from Fig. 11. Also in practice it is of advantage to have the curved front face portion 50 continuous with a straight, cylindrical face 52 of the inner, or base or body portion of the pin, and to taper the curved portion to the tip 53 of the pin, the curved portion being generally circular in cross-section. The length of the cylindrical portion is preferably such as effectively to protrude through the thickness of the assemblage of separate, superposed strips, during feed movement along the tangential portion of the path of the pins, so that the front cylindrical faces contact the leading edges of the apertures 11 for feeding the strips. As the pins move in their circular path and approach the record strip (at the left, Fig. 2), the inclined, concave or curved and tapered terminal portions are presented to the apertures in a generally forward direction, and as the pin rises into its relevant aperture, the incline or concavity is presented in position to receive the leading edge of the aperture and relieve this edge of much of the pressure and possible deformation inherent in pins in which the front face is cylindrical and not inclined. Having thus been received on the concave pin, the strip may settle down onto the straight cylindrical portions 52 of the pin for full feed engagement therewith. And it will be perceived that the inclined or concave face 50 cooperates to form a hook, or pin of generally hook shape, in which the tip of the hook is forwardly presented and, during feeding may overlap or overhang the leading edge of the aperture 11 in which the pin lies and assist in retaining the strip on the pins.

In order that disengagement of the pins from the apertures may be effected without unduly pressing or injuring the margins of the apertures, and thereby possibly impairing alignment of the strips with each other at the printing line, provision is made for shifting the individual feed pins at or near the point in the path where disengagement is to be effected, so that the overlapping portion of the curved pin may be eased through the aperture instead of biting through its margin. It will be seen that the pins have simultaneous sidewise movement and, when their feed sections are outside the pitch line, tend to press forwardly against the leading edges of the apertures where they pass from their tangential to their circular path around the sprocket wheel at the delivery or right hand end of the feed mechanism (Fig. 2). When forwardly curved or hook shape pins are employed, such tendency may be at times accentuated.

Each of the feed pins 33 is so mounted that it may be shifted, or turned about, thereby to present its convex or back-face in forward direction for the disengaging operation. Any suitable construction for accomplishing the shift is within the purview of this part of the invention. In the preferred arrangement, as illustrated, each pin 33 is mounted or connected for rotative movement on its supporting link of the chain or flexible pin carrying member. In the present embodiment a short shaft 54, extending generally axially of the feed pin, projects downwardly or inwardly from the pin through a bearing opening 55 in plate 37. Affixed to the shaft 54 is one or a series of driving teeth 56, which may be embodied in a gear wheel affixed to the shaft 54 as shown clearly in Figs. 10, 11, and 12. Carried by the pin is a supporting collar 57 which may be countersunk in the plate 37, so the underlying record strip resting on the plate 37 may, if desired, be in the exact plane of the line of centers of the pivots of the links.

Alongside of and parallel to the endless path of the series of feed pins 33, is a stationary, pin-controlling device which, in the present embodiment, includes a continuous, metal member 58, curved at each end 59 and 60, and having sets of teeth 61 and 62 at predetermined intervals in its periphery, for engaging the driving teeth 56 of the pins and rotating the feed pins one-half of a complete revolution. The continuous member 58 may be fixed in place by its laterally projecting portions 63, resting respectively in upper and lower notches in the frame block 18 and secured to the latter as by the screws 64. The fixed member 58 may be provided with a smooth surface or track 65, being a flange of the metal member 58, for supporting the pin-carrying plates 37, in their travel between the spaced sprocket wheels.

For maintaining the feed pins against rotation and in their effective feed positions except at the predetermined intervals of rotation or shift each pin has a rotation-restraining face which may be a flat face 66 of a collar 67 fixed to the pin, and cooperating with the side 68 of the flange so as to be held against rotation. At the intervals where the pin is to be rotated, the flange may be provided with a slot or opening 69 to enable the pins to be rotated at that point.

Instead of using pins having longitudinally curved sides, pins having longitudinally straight opposite faces inclined from the perpendicular, as illustrated in Figs. 14 and 15, may be used in certain special instances. But longitudinally curved pins are preferred as they have less tendency to injure the record strips and promote feeding and aligning more effectively, and possess distinct advantages over straight inclined pins.

A plate 70 forms a strip guide and retainer which may be employed to assure retention of the record strip on the pins at the tangential portion of their path. This retainer need not be employed in all cases, but is desirable especially when rapid feed movement of the strip is effected. The feed pins rise into and traverse the slot 71 in the retainer plate, the plate having upwardly or outwardly inclined slotted end portions cooperative to deflect the strip inwardly of the lengths of the pins in case deflection be needed. The retainer plate is supported on an arm 72 pivoted at 73 to a bracket 74 secured to the outer face of the clamping block 22, a curved plate spring 75 being held to the arm 72 by the strap 76, and cooperative resiliently to hold the retainer 70 either in operative relation to the feed pins, as illustrated in Figs. 7 and 8, or to hold it out of operative relation, as shown in Fig. 9. For limiting the movement of the retainer plate toward the strip, the bracket 74 may have the integral ears 79 and 80 with which the projections 77 and 78 on the arm 72 contact.

When the line spacing mechanism is actuated, the pin-feed mechanism will be actuated in synchronism therewith, and the feed-pins 33 will be moved in their endless path. The pins on the lower reach of the chain will be rotated by the teeth 62 so as to set their concave faces in forward position and their convex backs in rear position relative to their direction of feed movement. The tips of the pins will be presented in succession to the relevant feed aperture in the strip and the leading edges of the apertures will be received in the forward concavities, or longitudinally curved faces of the pins, instead of being strongly pressed as by straight pins which travel outside the pitch line or line of centers of the pivots of the chain. Having engaged in the apertures, the strip may settle down onto the strip supporting plates 37, so that the leading edges of the apertures engage the straight cylindrical bases of the pins. As feed movement continues, by subsequent line-spacing action, the strips are drawn around the platen and the apertures of the superposed strips brought into registry with each other, when not already in registry. Ordinarily the apertures will be in registry as it is preferred that the diameters of the pins be only slightly different from that of the apertures.

Thus the printed forms on superposed strips will also be in substantially superposed registry at the printing point, there being but little curvature in the strip from the printing point on the platen to the pin-feed mechanism. A plurality of the pins are simultaneously in engagement with a plurality of apertures along the tangential path of the pins, this tangential part being generally parallel to the path of the strip through the pin-feed mechanism. Preliminary to being disengaged from its aperture, each pin is shifted, as by being rotated by the teeth 61, so as to place its convex face in forward position. As the pin moves from its tangential to its circular path, its length is inclined rearwardly so that its aperture disengaging movement is in a great measure axially of the pin, and it recedes from the aperture in a generally axial direction notwithstanding its base is fixed to the chain link. After disengagement, the pins are restored to forwardly inclined relation by the next series of teeth 62, as will now be understood.

In the modification of Fig. 13, wherein the bases of the feed pins are inside the pitch line or line of centers of the pivots of the links, the aperture engaging and disengaging actions of the curved pins are generally similar to those explained in connection with the arrangement where the bases of the pins are outside said line of centers.

For leading the continuous strip to the machine, a rear paper table or strip supporting table may be mounted on the shiftable platen carriage. Side pieces of such table are shown at 81 and 82, the part 82 being detachably but rigidly secured to the platen carriage 5 by screws 83. The side piece 81 has a part or downward extension 84 screwed to the standard plate 17. Extending between the side pieces 81 and 82 are the rods 85, 86 and 87, which in conjunction with the side pieces form a rigid rear frame, on which the curved strip guiding and supporting plates 88, 89 and 90 are detachably supported. This rigid rear frame also may assist in bracing the standard plate 17.

Since certain changes may be made in the above construction and different embodiments of the invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent is:

1. In a recording machine for feeding and controlling record strips, the combination of a series of pins adapted to enter and to feed the strip and movable in a path intersecting the strip and into and out of said path, each of a plurality of said pins mounted for rotative movement on its longitudinal axis, and means for rotating said pins.

2. In a recording machine for feeding and controlling record strips, the combination of a chain of pivotally connected links, means mounting said chain for movement in a path having a circular part and a tangential part, each of a plurality of said links having a longitudinally curved pin adapted to enter and to feed the strip, the pins each having a strip-engaging-and-feeding section in the plane, substantially of the line of centres of the pivotal axes of said links and extending therefrom outside said plane, and means for imparting auxiliary movements to said pins to dispose them for withdrawal from strip engagement.

3. In a recording machine for feeding and controlling a record strip, the combination of a series of longitudinally curved pins adapted to enter and to feed the strip, means mounting said pins for sidewise movement in a path intersecting the path of the strip and into and out of said path, each of a plurality of said pins being mounted also for rotative movement on its longitudinal axis.

4. In a recording machine for feeding and controlling a record strip, the combination of a series of longitudinally curved pins adapted to enter and to feed the strip, means mounting said pins for sidewise movement in a path intersecting the path of the strip and into and out of said path, each of a plurality of said pins being mounted also for rotative movement on its longitudinal axis, means for imparting simultaneous sidewise movement to said pins in said path, and means, cooperable, to impart rotative movement to each of said pins at a predetermined interval in its path of sidewise movement.

5. A record-strip feed-pin adapted for entry into the record strip and having a concave front face and a convex back face and one or more driving teeth.

6. A record-strip feed-pin adapted for entry into the record strip and having a cylindrical base portion and a concave front face above said base portion and a convex back face and a series of driving teeth.

7. In a feed mechanism for record strips, the combination of a pin-guiding member movable in a path in part curved and in part tangential to the curved part, one or more pins adapted to enter and to feed the strip, means connecting each of said pins to said pin-guiding member for rotation on the latter, and means, including driving teeth on the respective pins, cooperable to rotate said pins.

8. In a feed mechanism for record strips, the combination of a pin-guiding member movable in a path in part deviating from the strip path and in part lying substantially along the strip path, one or more forwardly hooked pins adapted to enter and to feed the strip, means connecting each of said pins to said pin-guiding member for rotation on the latter, and means, including driving teeth on said pins and a fixed member having teeth with which said driving teeth are adapted to engage, cooperable to rotate said pins at predetermined points in said path.

9. In a feed mechanism for record strips, the combination of a pin-guiding member movable in a path in part deviating from the strip path and in part lying substantially along the strip path, one or more pins adapted to enter and to feed the strip, means connecting each of said pins to said pin-guiding member for rotation on the latter, and means, including driving teeth on said pins and a fixed member having teeth with which said driving teeth are adapted to engage, cooperable to rotate said pins at predetermined points in said path, said fixed member and pins having faces adapted to cooperate to restrain rotation of said pins except on said engagement of said teeth.

10. In a machine for feeding and controlling record strips, the combination of a pin-guiding, sprocket-chain of pivotally connected links, sprocket wheels engaging the chain, the axes of said sprocket wheels being spaced apart lengthwise of the chain, each of a plurality of the links of said chain having a rigid plate laterally projecting therefrom and a strip-feeding pin rotatively mounted on each of said plates.

11. In a machine for feeding and controlling record strips, the combination of a pin-guiding, sprocket-chain of pivotally connected links, supporting wheels engaging the chain, the axes of said supporting wheels being spaced apart lengthwise of the chain, each of a plurality of the links of said chain having a rigid plate laterally projecting therefrom and a forwardly hooked strip-feeding pin rotatively mounted on each of said plates, the rotatable pins each having a gear wheel affixed thereto.

12. In a machine for feeding and controlling record strips, the combination of a pin-guiding, sprocket-chain of pivotally connected links, sprocket wheels engaging the chain, the axes of said sprocket wheels being spaced apart lengthwise of the chain, and a longitudinal series of forwardly hooked strip feeding pins rotatably mounted on said sprocket chain, each of said rotatable pins having a gear wheel affixed thereto, a stationary, pin-controlling member generally parallel to the path of said sprocket-chain and having teeth adapted to cooperate with said gear wheels to impart rotation to said pins.

13. In a machine for feeding and controlling record strips, the combination of a pin-guiding, sprocket-chain of pivotally connected links, sprocket wheels engaging the chain, the axes of said sprocket wheels being spaced apart lengthwise of the chain, each of a plurality of the links of said chain having a rigid plate laterally projecting therefrom and a strip-feeding pin rotatively mounted on each of said plates, the rotatable pins each having a gear wheel affixed thereto, a stationary, pin-controlling member generally parallel to the path of said sprocket-chain and having teeth adapted to cooperate with said gear wheels to impart rotation to said pins, said stationary member having a track disposed to support said laterally projecting plates on their movement between said sprocket wheels.

14. In a machine for feeding and controlling record strips, the combination of a pin-guiding, sprocket-chain of pivotally connected links, sprocket wheels engaging the chain, the axes of said sprocket wheels being spaced apart lengthwise of the chain, a longitudinal series of strip feeding pins rotatably mounted on said sprocket chain, the rotatable pins each having a gear wheel affixed thereto, a stationary, pin-controlling member generally parallel to the path of said sprocket-chain and having teeth adapted to cooperate with said gear wheels to impart rotation to said pins, each of a plurality of said pins having a longitudinally concave front face and a longitudinally convex back face.

15. In a machine for feeding and controlling record strips, the combination of a pin-guiding, sprocket-chain of pivotally connected links, sprocket wheels engaging the teeth of said chain for driving the chain, the axes of said sprocket wheels being spaced apart lengthwise of the chain, respective of the links of said chain each having a rigid plate laterally projecting therefrom and a strip-feeding pin rotatively mounted on each of said plates, the rotatable pins each having a gear wheel affixed thereto, a stationary, pin-controlling member generally parallel to the path of said sprocket-chain and having teeth adapted to cooperate with said gear wheels to impart rotation to said pins, respective of said pins being of hook-shape.

16. In a recording machine for feeding and controlling record strips, the combination of a flexible pin-guiding member movable in a path having a circular part and a part tangential to said circular part, a series of feed pins supported on said member for movement therewith, each of said pins having a side portion inclined to the plane of feed movement of said support from the perpendicular and being shiftably connected to said member for being shifted to present either of opposite sides of the pin in the direction of feed movement of said series.

17. In a recording machine for feeding and controlling record strips, the combination of a flexible pin-guiding member movable in a path having a circular part and a part tangential to said circular part, a series of feed pins supported on said member for movement therewith, each of said pins having a side portion inclined to the plane of feed movement of said support from the perpendicular and means for imparting rotary movement to said pins at an interval or intervals in their path of feed movement.

18. In a recording machine for feeding and controlling record strips, the combination of a flexible pin-guiding member movable in a path having a circular part and a part tangential to said circular part, a series of feed pins supported on said member for movement therewith, each of said pins having each of opposite side portions thereof inclined to the plane of feed movement of said support from the perpendicular and being connected to said member for rotation on an axis perpendicular to said support.

19. In a recording machine for feeding and controlling record strips, the combination of a flexible pin-guiding member movable in a path having a circular part and a part tangential to said circular part, a series of feed pins supported on said member for movement therewith, each of said pins having each of opposite side portions thereof inclined to the plane of feed movement of said support from the perpendicular and being connected to said member for rotation on an axis perpendicular to said support and means, including a fixed member having a tooth and a tooth on each of said pins, cooperable to impart rotary movement to said pins at a predetermined interval in their path of feed movement.

20. In a recording machine for feeding and controlling record strips, the combination of a chain of pivotally connected links, means mounting said chain for movement in a path having a circular part and a tangential part, respective of said links each having a strip feeding pin having a side portion inclined from the perpendicular to the plane of feed movement of the link supporting such pin and being shiftably connected to such link to present either of two opposite sides of the pin in the direction of feed movement of the link.

21. In a recording machine for feeding and controlling record strips, the combination of a chain of pivotally connected links, means mounting said chain for movement in a path having a circular part and a tangential part, respective of said links each having a laterally projecting supporting plate substantially in the plane of the imaginary straight line joining the pivotal axes of the link and a strip feeding pin supported by each said plate and having a strip engaging side portion forwardly inclined from the perpendicular to the plane of movement of said plate and rotatable on said plate on an axis perpendicular to said plate, and means for automatically rotating said pins during strip feeding operation.

22. In a machine of the character described in combination, an endless flexible strip feeding band, longitudinally curved strip feeding pins carried by said band, each of a plurality of said pins being mounted on the band for rotation on its longitudinal axis.

23. In a machine for feeding and controlling record strips, in combination, a series of feed pins mounted for effecting strip feed, each of said feed pins being tapered toward its outer end with extreme front and rear forwardly inclined surfaces, and means for imparting auxiliary rotary movements to said pins substantially on their longitudinal axes so as to dispose said rear inclined surfaces in the direction of forward feeding movement for withdrawal of the pins from strip engagement.

CARL R. MABON.